(12) United States Patent
Barker et al.

(10) Patent No.: US 7,292,740 B1
(45) Date of Patent: Nov. 6, 2007

(54) APPARATUS AND METHOD FOR CONTROLLING TRANSMISSION THROUGH A PHOTONIC BAND GAP CRYSTAL

(75) Inventors: Delmar L. Barker, Tucson, AZ (US); William R. Owens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/624,581

(22) Filed: Jan. 18, 2007

(51) Int. Cl.
*G02F 1/335* (2006.01)

(52) U.S. Cl. .................................. 385/7; 385/9; 385/39

(58) Field of Classification Search ............... None
See application file for complete search history.

(56) References Cited

U.S. PATENT DOCUMENTS

| | | |
|---|---|---|
| 4,112,401 A | 9/1978 | Palmer et al. |
| 5,937,118 A | 8/1999 | Komori |
| 6,002,522 A | 12/1999 | Todori et al. |
| 6,014,246 A | 1/2000 | Asher et al. |
| 6,097,870 A | 8/2000 | Ranka et al. |
| 6,134,369 A | 10/2000 | Kurosawa |
| 6,430,342 B1 | 8/2002 | Kim et al. |
| 6,465,742 B1 | 10/2002 | Hiraoka et al. |
| 6,809,856 B2 | 10/2004 | Reed et al. |
| 2002/0021878 A1 | 2/2002 | Allan et al. |
| 2005/0082480 A1 | 4/2005 | Wagner et al. |
| 2006/0056463 A1 | 3/2006 | Wang et al. |
| 2006/0093296 A1 | 5/2006 | Jin et al. |
| 2006/0202125 A1 | 9/2006 | Suhami |
| 2007/0047965 A1 | 3/2007 | Liu et al. |
| 2007/0081165 A1 * | 4/2007 | Kilic et al. .................. 356/477 |

OTHER PUBLICATIONS

Smith, C., et al.,"Low loss hollow core silica/air photonic band gap fibre," Nature, vol. 424, Aug. 7, 2003.
Kehlif, A. et al., "Two dimensional phononic crystal with tunable narrow passband: Application to a waveguide with selective frequency," Jour. Appl. Phys., vol. 94, No. 3, Aug. 1, 2003.
Akahane, Y., et al., "High-Q photonic nanocavity in a two-dimensional photonic crystal," Nature, vol. 425, Oct. 30, 3003.

* cited by examiner

*Primary Examiner*—Sung Pak
*Assistant Examiner*—Chad H. Smith
(74) *Attorney, Agent, or Firm*—Renner, Otto, Boisselle & Sklar, LLP

(57) ABSTRACT

An apparatus (10) and method for dynamic frequency control of a photonic band gap crystal includes an acoustic band gap crystal (12) having a defect site (14), a photonic band gap crystal (20) in the defect site of the acoustic band gap crystal (12), and a sound wave generator (40) coupled to the acoustic band gap crystal (12). Consequently, acoustic waves in the acoustic band gap crystal (12) can be used to controllably alter transmission properties of the photonic band gap crystal (20) and thereby modulate the transmission of electromagnetic radiation through the photonic band gap crystal (20). Acoustic waves in the acoustic band gap crystal (12) can squeeze the photonic band gap crystal (20) to change its properties, including one or more of lattice constant, symmetry, and optical refractive index contrast.

18 Claims, 3 Drawing Sheets

APPARATUS AND METHOD FOR CONTROLLING TRANSMISSION THROUGH A PHOTONIC BAND GAP CRYSTAL

FIELD OF THE INVENTION

This invention relates generally to an apparatus and method for controlling transmission of electromagnetic radiation through a photonic band gap crystal, and more particularly, to an apparatus and method for controlling the transmission of electromagnetic radiation by changing the transmission characteristics of the photonic band gap crystal.

BACKGROUND

A crystal has a repeating pattern of atoms, ions, or molecules with fixed distances between constituent parts. Photonic band gap crystals, referred to as photonic band crystals (PBCs) or simply photonic crystals, are characterized by materials with different refractive indices generally periodically spaced in one or more dimensions. The periodic structure and the properties of the selected materials creates a band gap, a range of wavelengths of electromagnetic radiation that are reflected and cannot pass through the photonic crystal.

Photonic crystals have many applications including as filters, low-loss waveguides, high "Q" resonators, antennae, etc. For a filter, for example, incident light with a wavelength in the photonic band gap would be strongly reflected, producing a filter stop band, while light with a wavelength outside the photonic band gap would be transmitted through the photonic crystal.

SUMMARY

Dynamic frequency control of a photonic band gap crystal has been elusive, however. The present invention provides an apparatus and method for dynamic frequency control of a photonic band gap crystal by coupling an acoustic band gap (ABG) structure to a photonic band gap (PBG) structure such that control of one or more transmission properties of the PBG structure can be attained relatively efficiently and inexpensively.

More particularly, a photonic band gap crystal is embedded in a defect cavity site of an acoustic band gap crystal. Because the length scale of an acoustic band gap crystal's structure is larger than the length scale of a photonic band gap crystal's structure, the acoustic defect cavity is large enough to receive the photonic crystal therein. Acoustic waves in the acoustic crystal squeeze the photonic band gap crystal to change its properties, particularly one or more of lattice constant, symmetry, and optical refractive index contrast. A system employing such a combination can provide real-time control of a range of photonic signal parameters.

An exemplary apparatus includes an acoustic band gap crystal having a defect site and a photonic band gap crystal in the defect site of the acoustic crystal, whereby acoustic waves in the acoustic crystal can alter transmission properties of the photonic crystal to modulate the transmission of electromagnetic radiation through the photonic crystal.

An exemplary method provided by the present invention for controlling the transmission of electromagnetic radiation includes the following steps: (i) selectively transmitting electromagnetic radiation of a least one wavelength in a range of wavelengths transmittable through a photonic band gap crystal, where the photonic band gap crystal is in a defect site of an acoustic band gap crystal which in turn is coupled to a sound wave generator, and (ii) altering the properties of the photonic band gap crystal to change the range of transmittable wavelengths to selectively pass or block transmission of electromagnetic radiation of at least one wavelength by controlling the sound wave generator to generate acoustic waves in the acoustic band gap crystal.

The present invention also provides an apparatus for controlling the transmission of electromagnetic radiation that includes means for selectively transmitting electromagnetic radiation in a range of wavelengths, and means for altering the properties of the transmitting means to change the range of transmittable wavelengths to selectively pass or block transmission of electromagnetic radiation of at least one wavelength. The transmitting means may include a photonic crystal, and the altering means may include an acoustic crystal and an acoustic signal generator coupled to the acoustic crystal, which has a defect site that receives the photonic crystal, for example.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

The invention generally provides an apparatus and method for controlling the transmission of electromagnetic radiation through a photonic band gap crystal. By placing the photonic band gap crystal in a defect site of an acoustic band gap crystal, acoustic waves in the acoustic band gap crystal can be used to alter transmission properties of the photonic band gap crystal and thereby modulate the transmission of electromagnetic radiation through the photonic band gap crystal. In other words, the acoustic waves can change the band gap, i.e., the range of transmissible wavelengths in the photonic crystal, for selectively controlling the transmission of selected wavelengths of electromagnetic radiation.

Figure 1:
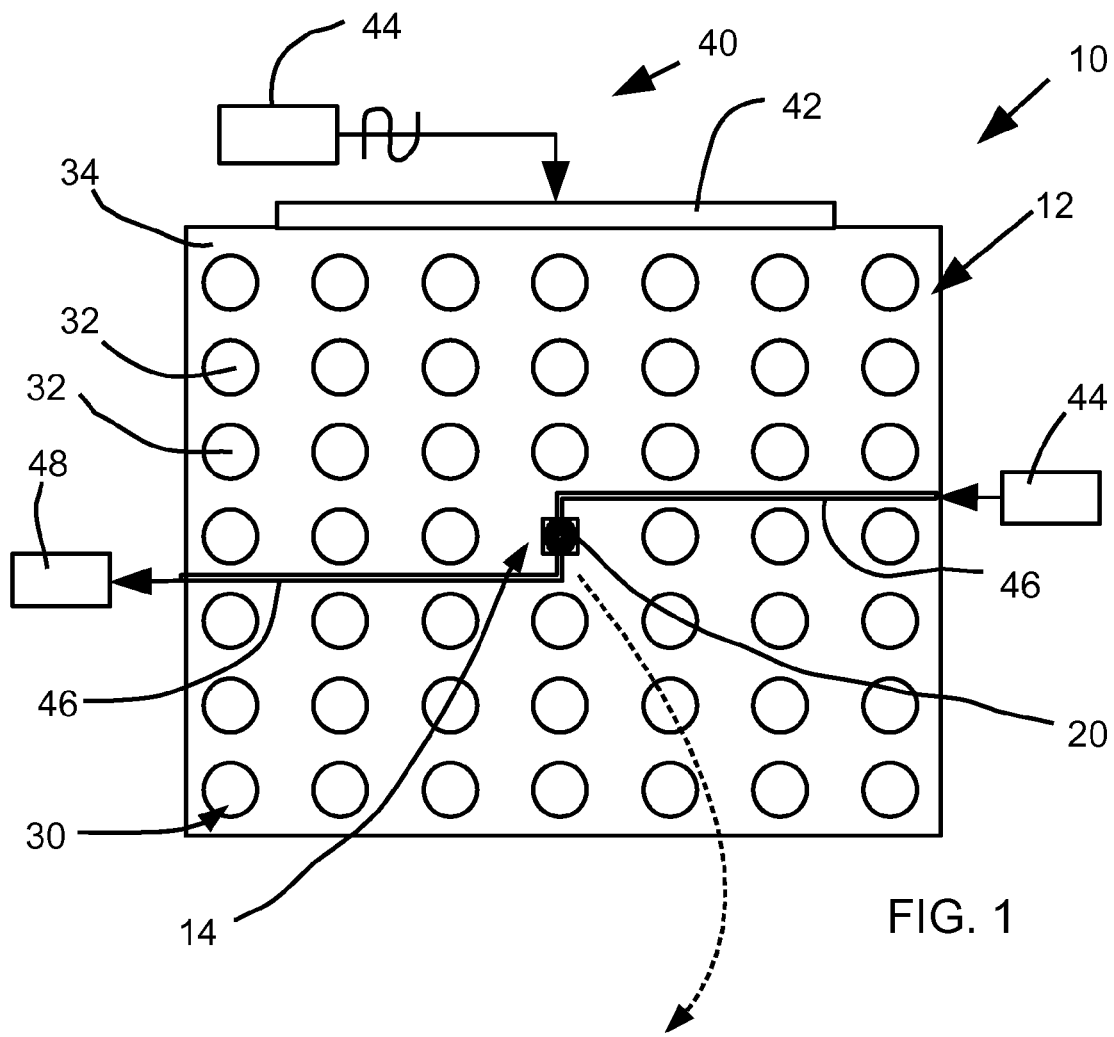
FIG. 1 is a schematic plan view of an exemplary apparatus provided in accordance with the present invention.
Figure 2:
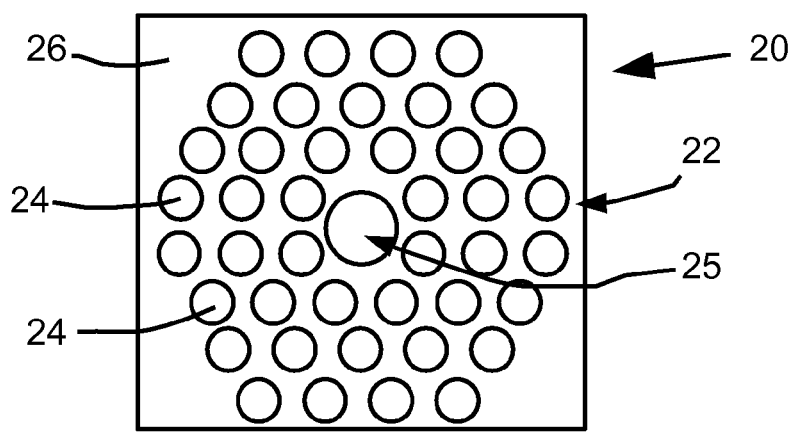
FIG. 2 is an enlarged plan view of a photonic crystal portion of the apparatus shown in FIG. 1.

Referring now to the drawings in detail, an exemplary apparatus 10 for controlling the transmission of electromagnetic radiation via a photonic band gap structure is schematically illustrated in FIGS. 1 and 2. The apparatus 10 includes an acoustic band gap crystal 12 having a defect site 14, and a photonic band gap crystal 20 in the defect site 14 of the acoustic crystal 12. As previously noted, the photonic band gap crystal can be referred to as a photonic crystal, and the acoustic band gap crystal can be referred to as an acoustic crystal. Although not drawn precisely to scale, the figures show that the photonic crystal 20 is much smaller than the acoustic crystal 12 due to the differences in wavelengths modulated by their respective structures.

Photonic crystals are characterized by at least two materials with different refractive indices that are periodically spaced in one or more dimensions. The periodic structure in the photonic crystal can be created using two different dielectric materials, materials that are electrical insulators or in which an electrical field can be perpetuated with a minimum loss in power. A wide variety of materials can be suitable for a photonic crystal, including metals, glasses, plastics, or combinations thereof. Silicon and silicon dioxide are exemplary dielectric materials for a photonic crystal, and air is an exemplary contrasting refractive index material for silicon or silicon dioxide. The materials for the photonic crystal are selected based on the wavelengths that are to be controlled.

The periodic structure and the properties of the selected materials making up the photonic crystal create a band gap, a range of wavelengths of electromagnetic radiation that are reflected and cannot pass through the photonic crystal, analogous to a similar effect on electrons in a semiconductor material. The periodic spacing typically is about half the wavelength to be modulated. In an exemplary embodiment the wavelength of interest is about 300 nanometers to about 1600 nanometers.

In the illustrated apparatus 10, the photonic crystal 20 includes a first or photonic array 22, which is an array of at least two materials having different photonic impedances, such as a first material 24 periodically spaced in a second material 26. The photonic array 22 also can have a defect site 25 as shown in FIG. 2, or not, depending on the use. A defect is an interruption in the periodicity of the arrangement of materials. In a one-dimensional array formed by alternating layers of materials with different refractive indices, although most of the layers will have a thickness of about half the wavelength of the electromagnetic radiation that is being modulated, the defect could be a layer that is thicker or thinner than other layers, for example.

The acoustic crystal 12 is analogous to the photonic crystal 20, with periodically-spaced materials having different acoustic impedances. The periodic spacing generally is approximately half the wavelength of interest, which is much larger than the wavelength of the electromagnetic radiation modulated by the photonic crystal 20. The acoustic crystal 12 includes a second or an acoustic array 30, which is an array of at least two different materials having different acoustic impedances, such as a third material 32 periodically spaced in a fourth material 34. Acoustic impedances for sound waves are analogous to photonic impedances for electromagnetic radiation, with sound waves traveling faster in materials with lower acoustic impedance. The acoustic crystal 12 includes a defect 14 in the periodicity of the acoustic array 30, and the photonic crystal 20 is located in the defect site 14.

The defect 14 in the acoustic array 30 can be a cavity defect, for example. The cavity defect can have monopole characteristics or higher-order multi-pole characteristics. The "Q" value can be controlled and nonlinear acoustic effects can be induced by cavity design. Acoustic defect cavity design provides many options for adjusting the intensity and spatial distribution of the pressures applied to the photonic crystal.

To generate the sound waves in the acoustic crystal 12, the apparatus 10 also includes a sound wave generator 40. A variety of mechanisms can produce sound waves in the acoustic crystal. An exemplary sound wave generator 40 includes a piezoelectric transducer. A suitable piezoelectric transducer includes a piezoelectric material, such as lead zirconate titanate (PZT). The sound wave generator 40 is coupled to the acoustic crystal 12 to generate the sound waves in the acoustic crystal 12 that can be used to control transmission characteristics of the photonic crystal 20. The transmission characteristics of the photonic crystal 20 that can be altered by the sound waves in the acoustic crystal 12 include one or more of lattice constant, symmetry, and optical refractive index contrast. A controller 42, which can be integral with or separate from the sound wave generator 40, controls the sound wave generator 40 and the generation of sound waves imparted to the acoustic crystal 12. The frequency of an exemplary acoustic signal provided by the sound wave generator is at least about 20,000 Hertz.

In FIG. 1, electromagnetic radiation travels from a source 44 through a waveguide 46 formed in the acoustic crystal 12 to the photonic crystal 20. If the radiation passes through the photonic crystal 20, the waveguide 46 directs the electromagnetic radiation out of the acoustic crystal 12 toward its destination 48. Because the waveguide 46 is so much smaller than the wavelength of the acoustic waves, the waveguide does not significantly dampen the velocity of the acoustic waves in the acoustic crystal 12.

Figure 3:
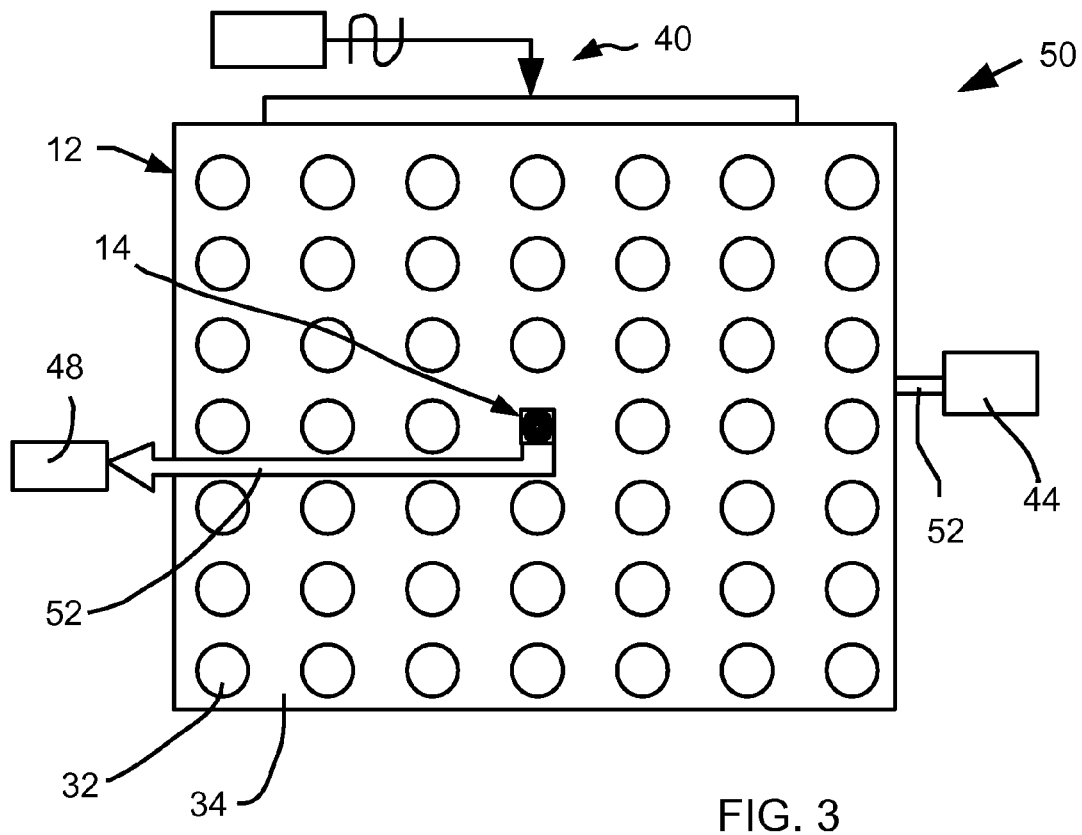
FIG. 3 is a schematic plan view of another exemplary apparatus provided in accordance with the present invention.
Figure 4:
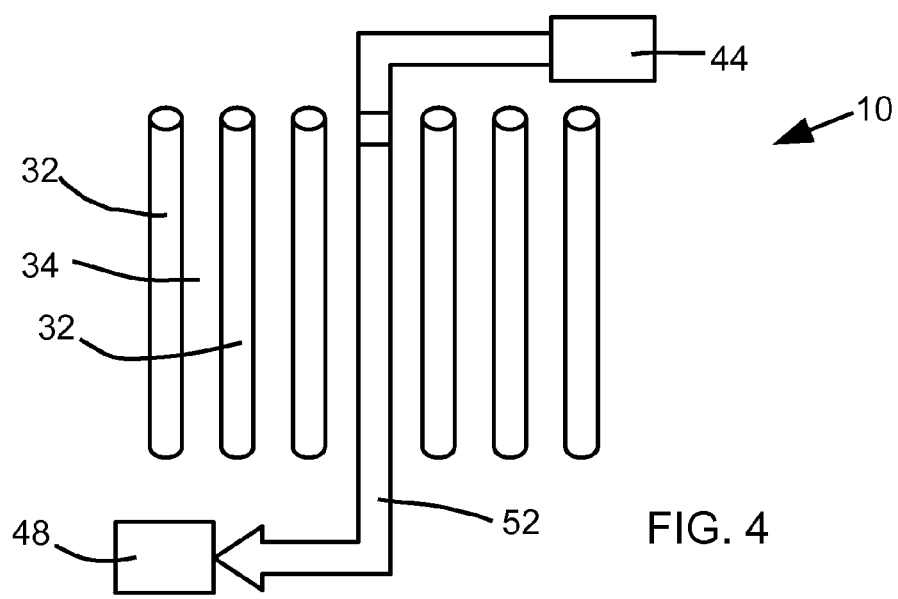
FIG. 4 is a schematic elevation view of a portion of the apparatus shown in FIG. 3.

In place of a waveguide for directing electromagnetic energy to and from the photonic crystal, the apparatus can include an optical fiber connected to or integral with the photonic crystal. A photonic crystal in the form of an optical fiber can be referred to as a photonic band gap optical fiber. The apparatus 50 shown in FIGS. 3 and 4 is similar to the apparatus 10 in FIG. 1 in many respects but employs a photonic band gap optical fiber 52 in place of the waveguide 46 and photonic crystal 20. The photonic band gap optical fiber 52 passes through the defect site 14 of the acoustic crystal 12, and sound waves generated by the sound wave generator 40 are controlled to modify the photonic band gap optical fiber 52 to pass or block electromagnetic radiation from passing through the fiber 52 past the acoustic crystal 12.

Such an apparatus, whether employing a waveguide or an optical fiber or another device for directing electromagnetic energy to the photonic crystal, is useful for frequency control applications, including real-time band gap control—including changing one or both of band gap width and position, switching a band gap on or off, modulating defect transmission in real time to provide a filter, controlling polarization of antennas and waveguides, and controlling a photonic band gap optical fiber to allow or block transmission of electromagnetic radiation therethrough and to control frequency mobility, to name a few applications.

Figure 5:
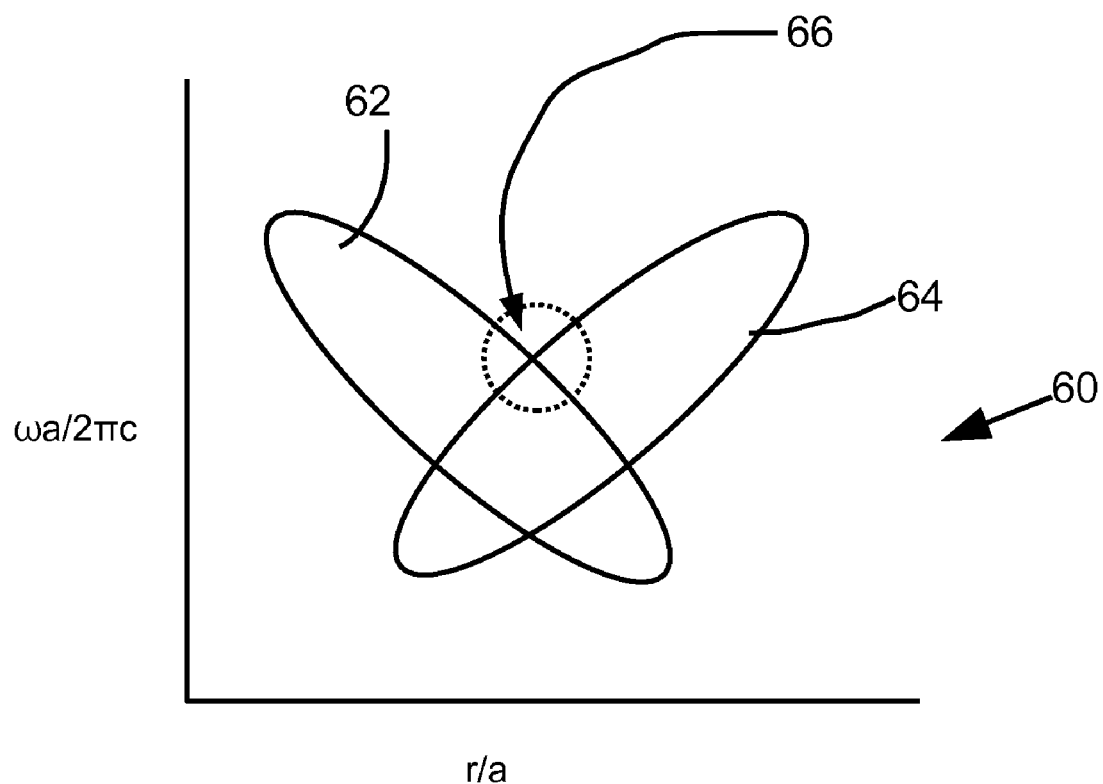
FIG. 5 is a graph illustrating polarization selectivity control that can be provided by an apparatus or method provided in accordance with the present invention.

FIG. 5 shows how altering the properties of a photonic crystal can change the polarization of the electromagnetic radiation. FIG. 5 is a graph 60 of lattice constant (r/a) vs. dimensionless frequency ($\omega a/2\pi c$) for a photonic crystal. The two ovals represent an overlapping parallel polarization region 62 and a perpendicular polarization region 64, respectively. The indicated vertex, in region 66, is next to all polarization states. By small acoustic perturbations of the lattice constant, the polarization of the electromagnetic radiation transmittable through the photonic crystal can be switched from one state to any other state.

The present invention also provides a method for controlling the transmission of electromagnetic radiation. The method includes the steps of selectively transmitting electromagnetic radiation of a least one wavelength in a range of wavelengths transmittable through a photonic band gap crystal (20, for example) in a defect site 14 of an acoustic band gap crystal 12 (see FIG. 1). The acoustic band gap crystal 12 is coupled to a sound wave generator 40. The method also includes the step of altering the properties of the photonic band gap crystal 20 to change the range of transmittable wavelengths to selectively pass or block transmission of electromagnetic radiation of at least one wavelength by controlling the sound wave generator 40 to generate acoustic waves in the acoustic band gap crystal 12.

Put another way, the present invention further provides an apparatus 10 or 50 for controlling the transmission of electromagnetic radiation that includes means for selectively transmitting electromagnetic radiation in a range of wavelengths, and means for altering the properties of the transmitting means to change the range of transmittable wavelengths to selectively pass or block transmission of electromagnetic radiation of at least one wavelength. The transmitting means can include a photonic crystal 20, e.g., in a defect site 14 of an acoustic crystal 12, and the altering means can include an acoustic signal generator 40 coupled to the acoustic crystal 12.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

We claim:

1. An apparatus for controlling the transmission of electromagnetic radiation, comprising an acoustic band gap crystal having a defect site and a photonic band gap crystal in the defect site of the acoustic crystal, whereby acoustic waves in the acoustic crystal can alter transmission properties of the photonic crystal to modulate the transmission of electromagnetic radiation through the photonic crystal.

2. An apparatus as set forth in claim 1, wherein the photonic band gap crystal includes a photonic array, which is an array of at least two materials having different photonic impedances.

3. An apparatus as set forth in claim 1, wherein the acoustic band gap crystal includes an acoustic band gap crystal having an acoustic array, which is an array of at least two different materials having different acoustic impedances.

4. An apparatus as set forth in claim 1, wherein the photonic array has a periodicity that is approximately half the wavelength of the electromagnetic radiation to be controllably transmitted therethrough.

5. An apparatus as set forth in claim 1, wherein the acoustic array has a periodicity that is approximately half the wavelength of the acoustic frequency of interest.

6. An apparatus as set forth in claim 1, wherein the photonic crystal is part of a waveguide.

7. An apparatus as set forth in claim 1, wherein the photonic crystal is part of a fiber optic cable.

8. An apparatus as set forth in claim 1, wherein the defect in the acoustic array is a cavity defect.

9. An apparatus as set forth in claim 8, wherein the cavity defect in the acoustic array has monopole characteristics.

10. An apparatus as set forth in claim 8, wherein the cavity defect in the acoustic array has higher order multi-pole characteristics.

11. An apparatus as set forth in claim 1, wherein the photonic crystal includes a defect in the photonic array.

12. An apparatus as set forth in claim 1, comprising a sound wave generator coupled to the acoustic crystal to control characteristics of the photonic crystal.

13. An apparatus as set forth in claim 12, wherein the sound wave generator includes a piezoelectric transducer.

14. An apparatus as set forth in claim 12, comprising a controller that controls the sound wave generator.

15. An apparatus as set forth in claim 12, wherein the sound wave generator generates an acoustic signal having a frequency of at least about 20,000 Hz.

16. An apparatus as set forth in claim 1, wherein photonic band gap crystal has a photonic band gap at wavelengths of about 300 nanometers to about 1600 nanometers.

17. A method for controlling the transmission of electromagnetic radiation, comprising the steps of selectively transmitting electromagnetic radiation of a least one wavelength in a range of wavelengths transmittable through a photonic band gap crystal in a defect site of an acoustic band gap crystal which is coupled to a sound wave generator; and altering the properties of the photonic band gap crystal to change the range of transmittable wavelengths to selectively pass or block transmission of electromagnetic radiation of at least one wavelength by controlling the sound wave generator to generate acoustic waves in the acoustic band gap crystal.

18. An apparatus for controlling the transmission of electromagnetic radiation, comprising means for selectively transmitting electromagnetic radiation in a range of wavelengths; and means for altering the properties of the transmitting means to change the range of transmittable wavelengths to selectively pass or block transmission of electromagnetic radiation of at least one wavelength wherein the transmitting means includes a photonic crystal, and the altering means includes an acoustic crystal and an acoustic signal generator coupled to the acoustic crystal, which has a defect site that receives the photonic crystal.

* * * * *